Aug. 27, 1963  L. PÉRAS  3,101,672
METHODS OF MANUFACTURING HYDRODYNAMIC TORQUE TRANSMITTERS
Filed April 24, 1961
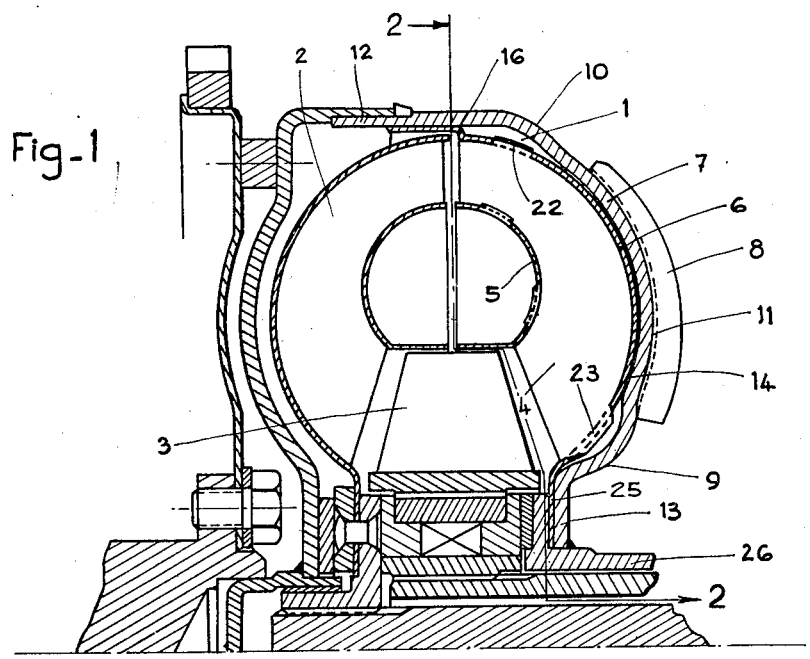
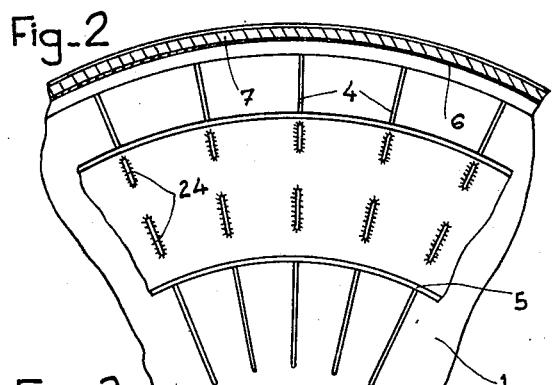
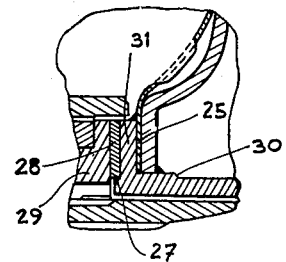
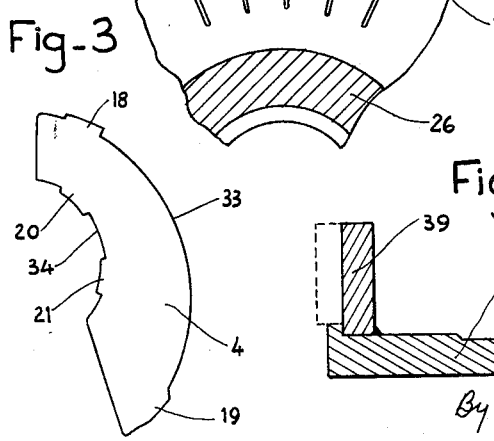
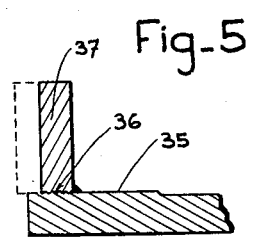
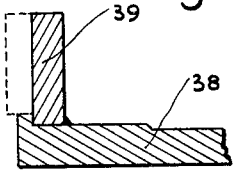
Inventor
Lucien Péras
By Stevens Davis Miller & Mosher
Attorneys 3,101,672
Patented Aug. 27, 1963

3,101,672
METHODS OF MANUFACTURING HYDRO-DYNAMIC TORQUE TRANSMITTERS
Lucien Péras, Billancourt, France, assignor to Regie Nationale des Usines Renault, Billancourt, France
Filed Apr. 24, 1961, Ser. No. 105,147
Claims priority, application France Apr. 27, 1960
1 Claim. (Cl. 103—115)

This invention relates in general to hydrodynamic torque transmitters wherein the cooperating bladed members are made from steel sheet stock. This invention is concerned more particularly with the method of assembling the component elements of said bladed members, including the fastening of the blades and the anchoring of the hubs.

Many modern sheet metal hydrodynamic torque transmitter constructions are already known. These devices rely on complex techniques intervening in cascade in the assembly and necessitating costly and varied means as well as frequent handlings during the manufacture.

It is the essential object of this invention to provide an improved method whereby devices of the type set forth hereinabove can be manufactured in a simple and rapid manner as consistent with high-rate and cost requirements of modern mass production.

According to a specific form of embodiment of this invention, the rotary members of the device comprise inner and outer casings or shells of pressed steel sheet. The inner casings are formed with a row of spaced slots engaged by a series of lugs cut from the blading edges.

Although it is already known to use coacting slots and lugs, the latter engaging the former to provide the desired assembly, the arrangement according to this invention ensures substantial improvements leading to simplifications of which a few examples are listed hereafter:

The lugs of a same set of blades are not folded or clenched and have no specific orientation. The number of slots and lugs is relatively small. The steel sheets are generally thinner than in any known arrangements, so that the pressing and cutting operations are greatly facilitated. As the rotary members are lighter in weight they pick up speed much faster.

The whole of the component elements of a rotary member, including its hub, are assembled through any known and suitable method, for example by welding or gluing in a single operation.

Thus, a compact, sturdy, light and economical assembly is obtained which is completely satisfactory from the dual point of view of rigidity and hydraulic efficiency.

This novel method of manufacturing bladed components is applicable with particularly good results to the construction of impellers and the following description will refer more specifically to its application to the manufacture of this member, although it is also applicable to any other bladed rotary member. Therefore, the following description should not be construed as limiting the invention.

In addition to the advantageous features briefly set forth hereinabove, other advantages and valuable features of the invention will appear as the description proceeds with reference to the accompanying drawing, in which:

FIGURE 1 is a half axial section showing a hydrodynamic torque transmitter comprising an impeller constructed according to the teachings of this invention;

FIGURE 2 is a section taken upon the line 2—2 of FIG. 1;

FIGURE 3 is a side view of an impeller blading utilized in the assembly of FIG. 1;

FIGURE 4 is a fragmentary axial section showing the assembly of the hub with the pressed parts, and FIGURES 5 and 6 are sectional details showing different embodiments of the assembly of FIG. 4.

In FIG. 1 the three conventional members constituting a hydrodynamic torque converter are designated by the reference numerals 1 for the impeller, 2 for the turbine and 3 for the reaction member.

Although in this figure only the impeller is shown as being constructed according to the teachings of this invention, it is clear that the other two members could also be manufactured along the same lines, and therefore this impeller will be described hereinafter in detail by way of example.

Referring to FIGS. 1 and 2 of the drawing it will be seen that the impeller 1 comprises a hub 26, an inner casing 5, an outer casing 6, a row of identical, regularly spaced blades 4 mounted between the inner and outer casings 5, 6, and an outer shell 7 corresponding in shape to said outer casing 6.

A row of blades or vanes 8 irregularly spaced along a same radius are secured on the outer wall of said outer shell.

The outer shell 7 is pressed from relatively thick steel sheet stock and formed with a pair of swells of revolution 9, 10 located the one as close and the other as far as possible from the axis of revolution of the converter. Between these two annular swells the shell has a part-toroidal configuration as shown at 11. The outermost swell 10 has a cylindrical extension 12 coaxial with the axis of revolution and the innermost swell 9 has a central extension in the form of a flat annular portion 13 extending at right angles to the axis.

The inner wall of the outer cylindrical wall 12 constitutes a guide member for mounting the outer casing 6 made from relatively thin steel sheet. In its intermediate portion this casing is pressed to a part-toroidal configuration 14 except in the area adjacent to the axis of rotation and at its periphery:

On the one hand the casing 6 has an inner extension in the form of a plane annular portion 25 extending at right angles to the axis so as to fit edge to edge against the corresponding or registering plane annular portion 12 of the shell.

On the other hand, the casing is formed along its peripheral edge with a cylindrical stepped portion coaxial to the cylindrical extension 12 of the outer shell 7 to provide a convenient mounting arrangement with this cylindrical extension with a well-defined fit, wherein the relative elasticity of the two parts having different thicknesses plays the essential function.

The blades 4 whereby the engine torque is transferred to the hydraulic fluid have a contour consistent with the shapes of casings 5 and 6, as shown in FIG. 3, so as to form with these casings a series of identical channels regularly spaced about the axis of rotation.

According to a specific embodiment of this invention, each blade is formed with a pair of integral outer lugs 18, 19 and a pair of integral inner lugs 20, 21 projecting therefrom. The pair of outer lugs 18, 19 engage with a certain clearance a series of corresponding slots 22, 23. Similarly, the pair of inner lugs 20, 21 engage a series of corresponding slots 24 punched in the inner casing 5.

It is worth pointing out that in contradistinction with known methods and arrangements, said lugs and slots coact with a clearance permitting considerable tolerances without necessitating a consolidation of the engagement by clenching the lug ends over the casing surface.

Under these conditions the assembly is as follows:

The shell 7 provided with an external series of pressed blades 8 for ventilating purposes which are irregularly spaced and welded on the outer wall, is laid horizontally on a plane tangent to the outer edges of blades 8.

The punched outer casing 6 is introduced into the shell 7 until the two annular flat portions 13 and 25 on which the hub 26 is to be subsequently centered contact each other in face to face relationship.

The two part-toroidal portions 14 and 11 of casing 6 and shell 7 respectively are thus very close to each other, however without allowing in any case the very broad tolerances introduced in the relative assembly of these two members to ensure the relative contact between these members when the aforesaid annular flat portions 13 and 25 engage each other. If desired, this engagement between the annular portions 13 and 25 may be reinforced by a few welding spots.

It is known that it is of current practice to double or clench the blade lugs over the supporting casings in order to provide a rigid assembly. This leads to provide a substantial clearance between the shell and the casing, and a certain quantity of oil without any convection motion accumulates therein and constitutes a thermal barrier detrimental to the proper cooling of the converter.

It is a specific feature of the arrangement of this invention to assign on the other hand an extremely small clearance between the two adjacent part-toroidal portions, whereby this inconvenience is eliminated.

After the outer casing has been fitted in the manner set forth hereinabove, the blades 4 of which a typical embodiment is shown in FIG. 3 are distributed and occupy the locations contemplated according to the angular distribution of the slots 22, 23 punched in the casing, so that the part-toroidal external contour 33 of these blades 4 will correspond in shape to the relevant hollow contour of the casing.

The inner casing 5 having subsantially a part-toroidal configuration and formed with spaced slots 24 as already stated is so positioned that its outer wall registers with the inner contour 34 of blades 4 of which the lugs 20, 21 engage with a relatively large clearance the relevant slots 24.

Finally, the hub 26 which may advantageously consist of a sintered part is incorporated in the resulting assembly.

As shown in FIG. 4, this hub 26 comprises a centering shoulder 27 adapted to receive the abutment 28 of the reaction member 29 and a cylindrical portion 30 fitting through the coaxial bores of the flat annular surfaces of the outer casing 6 and shell 7. This cylindrical portion is adjusted with a view to ensure a proper positioning when the collar 31 engages the relevant plane annular surface 25 of the outer casing 6.

The impeller assembly is completed by carrying out a single-step brazing in a furnace. The tolerances in the dimensioning of the slots and co-acting lugs are so distributed that in any case the relative play between these slots and lugs is consistent with the requirements of an efficient brazing. The hard solder is so disposed as to eliminate this clearance and to rigidly assemble all the contacting surfaces of shell 7, outer casing 6 and hub 26, as shown in FIG. 1 and notably in FIG. 2 constituting a part-elevational view of the impeller from the inside.

The axial dimensions of the hub 26 are such that the hub is constantly suspended without contacting the furnace bottom on which the impeller is supported in its mounting position.

It is clear that this extremely simple method of assembling the component elements of a hydrodynamic torque converter or like coupling does not involve the use of costly equipment or tools and is free of any transfer steps as usual in the known hooking or clenching methods.

The rigidity imparted by the brazing operation to the above described method of assembly permits the use of considerably thinner steel sheets than those required in conventional methods, whether for the blading or for the casings. Therefore, the power requirements for pressing and punching the parts are reduced accordingly and the tools have a longer useful life.

Under these conditions, the small number of assembly steps, their simplicity, the fact of performing the final assembly in a single step, and the use of thinner steel sheets constitute remarkable features of this invention combined to obtain the desired low cost and high production rates.

FIGURES 5 and 6 of the drawing illustrate two typical, particularly economical embodiments of the hub 26 which are particularly suitable for carrying out this invention. The cylindrical portion 35 coaxial to the impeller of FIG. 5 is cut from commercial tube stock on which a local knurling operation is carried out at 36 for holding the collar 37 in a predetermined position.

This collar 37 is a simple punched washer serving the purpose of maintaining the hub 26 in engagement with the registering annular face of the annular flat face of the outer casing 6 before and during the final brazing step.

The inward extension of the cylindrical portion of hub 26 is suitable for centering the abutment 28 between the reaction member and the impeller.

FIGURE 6 constitutes a modified embodiment of a similar construction with the difference that the tubular portion 38 of hub 26 is machined to form a shoulder adapted to receive the pressed or punched washer 39 and hold the hub in position before and during the brazing operation.

It may be noted that in the final assembly the use of a brazing method is not compulsory and that it would not constitute a departure from the basic principles of this invention to resort to other assembly methods such as gluing by using thermosetting resins and the like.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claim.

I claim:

An impeller structure for an hydrodynamic device comprising a shell with an inner annular edge portion and an outer axially extending cylindrical edge portion and a toroidal portion extending between said edge portions, pairs of radially spaced outwardly projecting bowed portions in said shell disposed between said toroidal portion and said inner and outer edge portions, respectively, inner and outer casings disposed within said shell with blades extending between said casings, said casings having slots therein, outwardly extending integral lugs on opposite sides of said blades extending through said slots and bonded thereto, said slots being substantially larger in dimension than the dimension of said lugs extending therein, said outer casing having a cylindrical axially extending outer edge portion and an annular inner edge portion corresponding to the edge portions of said shell and mounted in face to face sealed contact therewith and secured thereto, said lugs on said outer side of said blades extending through said outer casing and into said bowed portions, and said toroidal portions of said outer casing and shell being disposed closely contiguous to each other without contacting each other.

References Cited in the file of this patent

UNITED STATES PATENTS

| | | |
|---|---|---|
| 2,328,393 | Neracher et al. | Aug. 31, 1943 |
| 2,387,722 | Dodge | Oct. 30, 1945 |
| 2,542,913 | Ensign | Feb. 20, 1951 |
| 2,613,503 | Syrovy | Oct. 14, 1952 |
| 2,701,951 | Jandasek | Feb. 15, 1955 |
| 2,745,354 | English et al. | May 15, 1956 |
| 2,855,803 | Knowles | Oct. 14, 1958 |
| 2,855,852 | Gamble | Oct. 14, 1958 |